(12) United States Patent
Yoshimura et al.

(10) Patent No.: US 11,493,770 B2
(45) Date of Patent: Nov. 8, 2022

(54) HEAD-MOUNTED DISPLAY

(71) Applicant: SEIKO EPSON CORPORATION, Tokyo (JP)

(72) Inventors: Yoshihiro Yoshimura, Matsumoto (JP); Kazuya Kamakura, Matsumoto (JP); Naoto Aruga, Okaya (JP)

(73) Assignee: SEIKO EPSON CORPORATION, Tokyo (JP)

( * ) Notice: Subject to any disclaimer, the term of this patent is extended or adjusted under 35 U.S.C. 154(b) by 107 days.

(21) Appl. No.: 16/847,726

(22) Filed: Apr. 14, 2020

(65) Prior Publication Data

US 2020/0326553 A1 Oct. 15, 2020

(30) Foreign Application Priority Data

Apr. 15, 2019 (JP) .............................. JP2019-076865

(51) Int. Cl.
*G02B 27/01* (2006.01)

(52) U.S. Cl.
CPC ..... *G02B 27/0176* (2013.01); *G02B 27/0172* (2013.01); *G02B 2027/0178* (2013.01)

(58) Field of Classification Search
CPC .............. G02B 27/017; G02B 27/0176; G02B 27/0172; G02B 2027/0178; G02B 17/0856
See application file for complete search history.

(56) References Cited

U.S. PATENT DOCUMENTS

| | | | |
|---|---|---|---|
| 2016/0204839 A1* | 7/2016 | Liu | H04W 4/02 345/8 |
| 2017/0184862 A1* | 6/2017 | Miyao | G02B 6/0001 |
| 2017/0237935 A1* | 8/2017 | Totani | G03B 21/16 348/802 |
| 2020/0257384 A1* | 8/2020 | Ahne | G02B 27/017 |

FOREIGN PATENT DOCUMENTS

JP 2018-054979 A 4/2018

* cited by examiner

*Primary Examiner* — Stacy Khoo
(74) *Attorney, Agent, or Firm* — Oliff PLC

(57) ABSTRACT

A head-mounted display includes a frame having conductivity, a first display device and a second display device supported by the frame, a cable shielded by a conductive cloth, and a screwing structure configured to interpose the cable between the frame and the first and second display devices. The screwing structure holds a conducting region of the frame and the conductive cloth in a state where the conducting region of the frame and the conductive cloth are electrically coupled.

10 Claims, 11 Drawing Sheets

HEAD-MOUNTED DISPLAY

The present application is based on, and claims priority from JP Application Serial Number 2019-076865, filed Apr. 15, 2019, the disclosure of which is hereby incorporated by reference herein in its entirety.

BACKGROUND

1. Technical Field

The present disclosure relates to a head-mounted display that enables visual recognition of a virtual image by a wearer.

2. Related Art

As a head-mounted display, there has been known, for example, a type in which sealing is applied to a cable constituting a harness extending along a frame, as illustrated in FIG. 19 of JP-A-2018-54979. A sealing such as described above conceivably not only dissipates heat but also suppresses noise from coming into the cable. Note that the head-mounted display is also described as an HMD in the following.

Nevertheless, in the HMD of JP-A-2018-54979, when a material having conductivity such as a metal is used for the frame and the frame is not coupled to a ground, for example, noise may be generated from the frame as electrical current is produced for signal communication or power supply in a cable extending along a rod-shaped portion of the frame, affecting other electronic components.

SUMMARY

According to an aspect of the present disclosure, a head-mounted display includes a frame having conductivity, an optical component supported by the frame, a cable shielded by a sealing member, and an interposing structure configured to interpose the cable between the frame and the optical component. The interposing structure is further configured to hold a conducting region of the frame and the sealing member in a state of being electrically coupled.

DESCRIPTION OF EXEMPLARY EMBODIMENTS

First Exemplary Embodiment

A head-mounted display according to a first exemplary embodiment of the present disclosure will be described below in detail with reference to FIG. 1 and the like.

Figure 1:
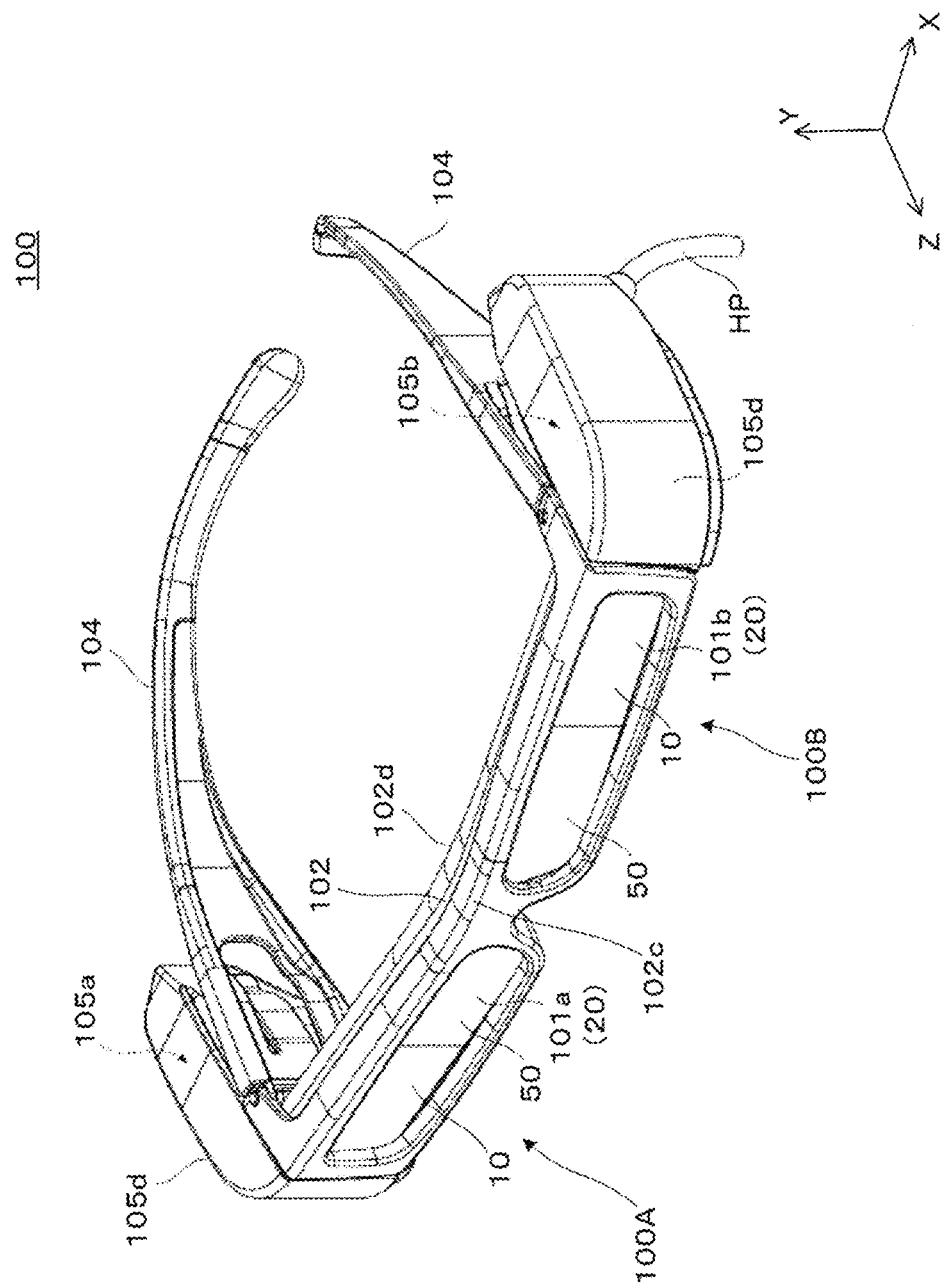
FIG. 1 is a perspective view illustrating an example of a head-mounted display according to a first exemplary embodiment.

As illustrated in FIG. 1, a head-mounted display (HMD) 100 of the present exemplary embodiment is a head-mounted display apparatus having a spectacle-like external appearance, and allows an observer or user who wears the head-mounted display 100 to visually recognize imaging light (image light) in a virtual image, and visually recognize or observe an external world image in a see-through manner. Accordingly, the head-mounted display 100 is also referred to as a virtual image display device. The head-mounted display 100 includes a first display device 100A, a second display device 100B, and a frame 102 having conductivity. Further, as described in detail later, the head-mounted display 100 includes a harness HP including a cable provided along the frame 102 on an inner side of the frame 102 and coupled to an external device (not illustrated).

Note that, in FIG. 1 and the like, X, Y, and Z constitute an orthogonal coordinate system in which a +X direction and a −X direction correspond to lateral directions in which both eyes of an observer, who is wearing the head-mounted display 100, are aligned, a +Y direction corresponds to an upward direction orthogonal to the lateral direction in which both eyes of the observer are aligned, and a +Z direction corresponds to a forward direction or a front direction for the observer. When X, Y, and Z are expressed as directions of the head-mounted display 100, first the X-axis corresponds to an axis in a direction in which two light-guiding members 10 constituting the first display device 100A and the second display device 100B are aligned. The Z-axis corresponds to an axis in an exiting direction of imaging light (image light) from the light-guiding member 10. The Y-axis corresponds to an axis orthogonal to both the X-axis and the Z-axis.

The first display device 100A and the second display device 100B are display units that respectively form a virtual image for the right eye and a virtual image for the left eye. The first display device 100A for the right eye is an optical component including a first optical member 101a that transparently covers the front of the eye of the observer, and a first image forming main body portion 105a that forms imaging light. The second display device 100B for the left eye is an optical component including a second optical member 101b that transparently covers the front of the eye of the observer, and a second image forming main body portion 105b that forms imaging light. Note that, when the first and second display devices 100A, 100B are collectively referred to as a display unit, the first display device 100A is regarded as the first display unit, and the second display device 100B is regarded as the second display unit to differentiate and identify the left and right configurations.

The first and second image forming main body portions 105a, 105b each include an image display device (image element) 80, which is an image forming device, an optical system for image formation such as a projection lens 30 (refer to FIG. 8), a member housing these optical systems, and the like. Note that these are covered and thus supported and housed by a cover-like sheath member 105*d* illustrated in FIG. 1.

The first and second optical members 101*a*, 101*b* are light-guiding portions that guide the image light formed by the first and second image forming main body portions 105*a*, 105*b* and superimpose the external light and the image light to achieve visual recognition, and constitute a light-guiding device. Hereinafter, the first optical member 101*a* or the second optical member 101*b* is also referred to as a light-guiding device 20. While a structure of the light-guiding device 20 is described in detail below, the light-guiding device 20 includes the light-guiding member 10 for guiding the image light and for a see-through perspective of the external light that passed through the first and second optical members 101*a*, 101*b*, and a light-transmitting member 50 for the see-through perspective of the external light.

Note that the first display device 100A and the second display device 100B function as display devices (virtual image display devices), solely or combined. That is, the individual display devices 100A, 100B may be single display units.

Further, here, in the head-mounted display 100, the optical components supported by the frame 102 first include components such as the first display device 100A and the second display device 100B described above. Furthermore, elements constituting the first display device 100A and the like are also such optical components. That is, the first and second optical members 101*a*, 101*b* (the light-guiding devices 20), the first and second image forming main body portions 105*a*, 105*b*, or a component in a state of housing these, elements constituting these, and the like are also optical components supported by the frame 102.

The frame 102, as described above, is a member that supports the first display device 100A and the second display device 100B or elements constituting these. The frame 102 includes a deck cover 102*d* having conductivity and constituting a main body portion that supports each component, and a cover member 102*c* that provides covering from a front face of the deck cover 102*d*.

The deck cover 102*d* is an elongated member bent into a U-shape in plan view, and is a one-piece component made of metal. Here, as an example, the deck cover 102*d* is a conductive member composed of a magnesium alloy. The deck cover 102*d* includes a pair of screwing structures (screwing structures SSa, SSb illustrated in FIG. 4 and FIG. 6) as left and right end portions, each bent into a U-shape. Note that temples 104 are provided, which are portions extending rearward from both left and right ends of the deck cover 102*d*, and can be brought into contact with and supported by the ears, the temples, or the like of the observer. Further, the first and second image forming main body portions 105*a*, 105*b* are attached to the deck cover 102*d*.

The cover member 102*c* is a member made of resin having a spectacle-like shape covering the first and second optical members 101*a*, 101*b*, that is, the light-guiding devices 20, constituting the display unit.

Figure 2:
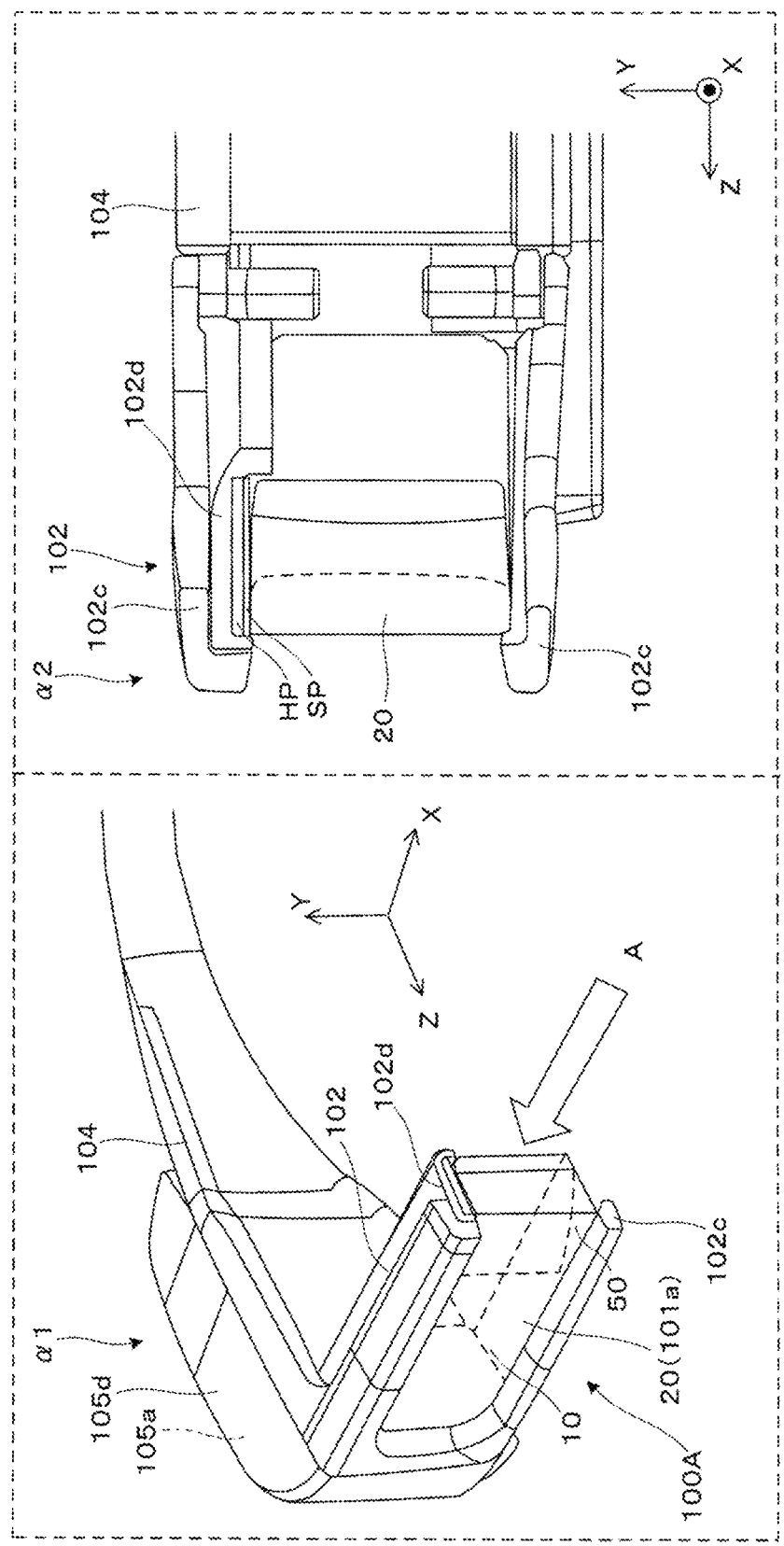
FIG. 2 is a cross-sectional view for explaining an internal structure of the head-mounted display.
Figure 3:
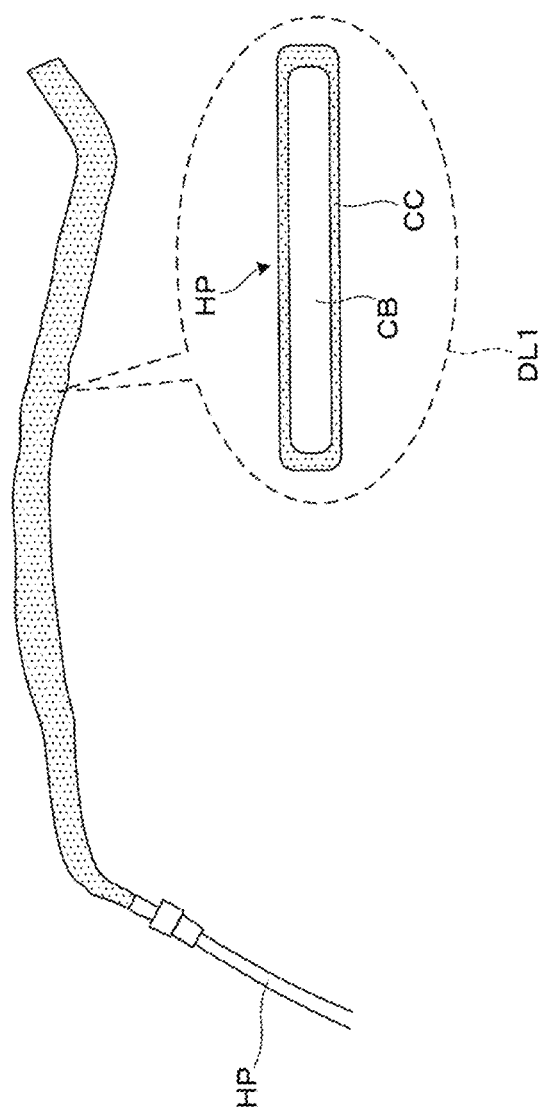
FIG. 3 is a conceptual view for explaining a structure of a harness.

Below, an overall structure of the head-mounted display 100 and the constituent elements constituting each component will be described with reference to FIG. 2 to FIG. 7. FIG. 2 is a cross-sectional view for explaining an internal structure of the head-mounted display 100. FIG. 3 is a conceptual view for explaining a structure of the harness HP.

Figure 4:
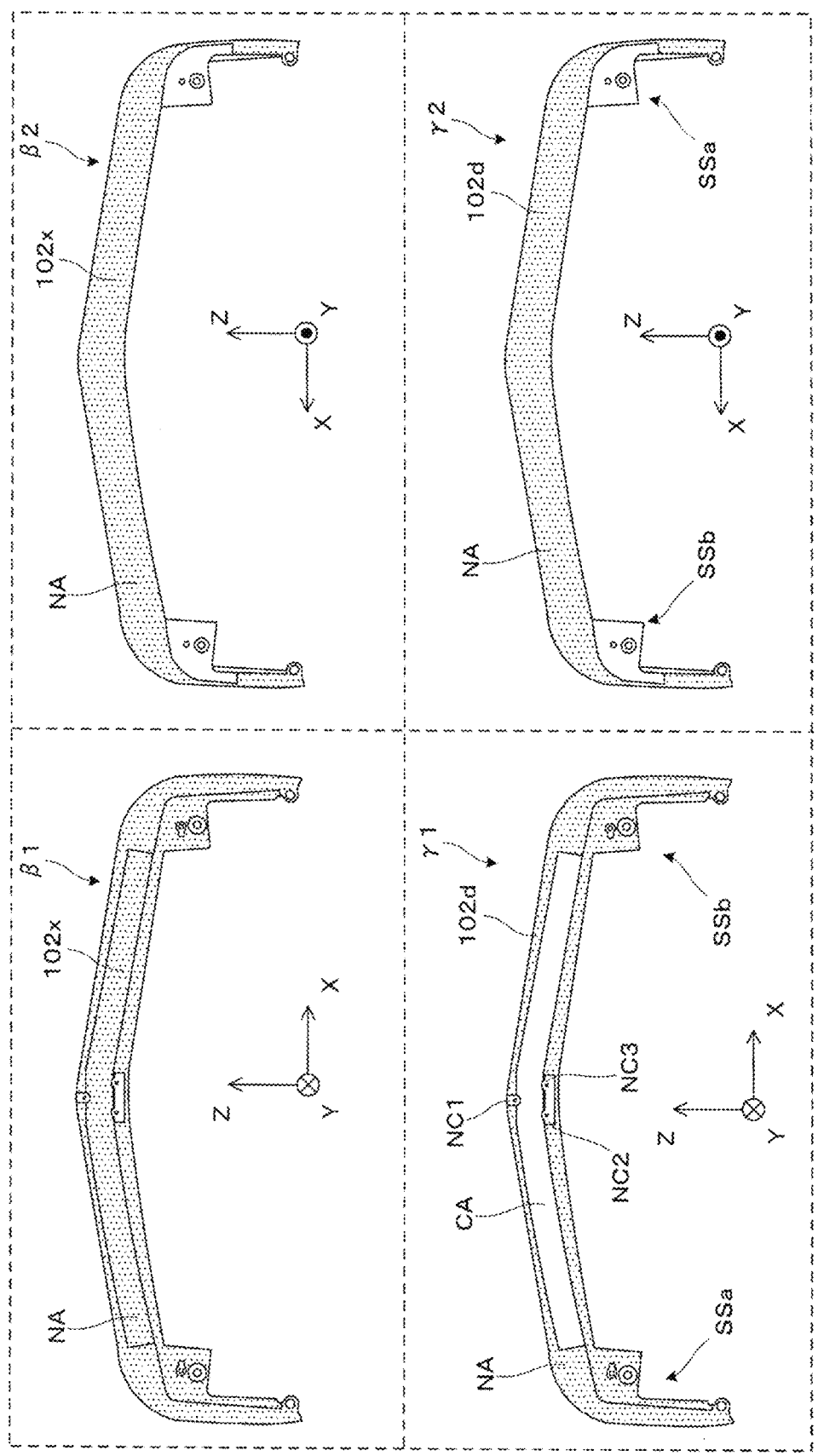
FIG. 4 is a diagram for explaining a metal component of a frame in an example of the present exemplary embodiment, with reference to a comparative example.
Figure 5:
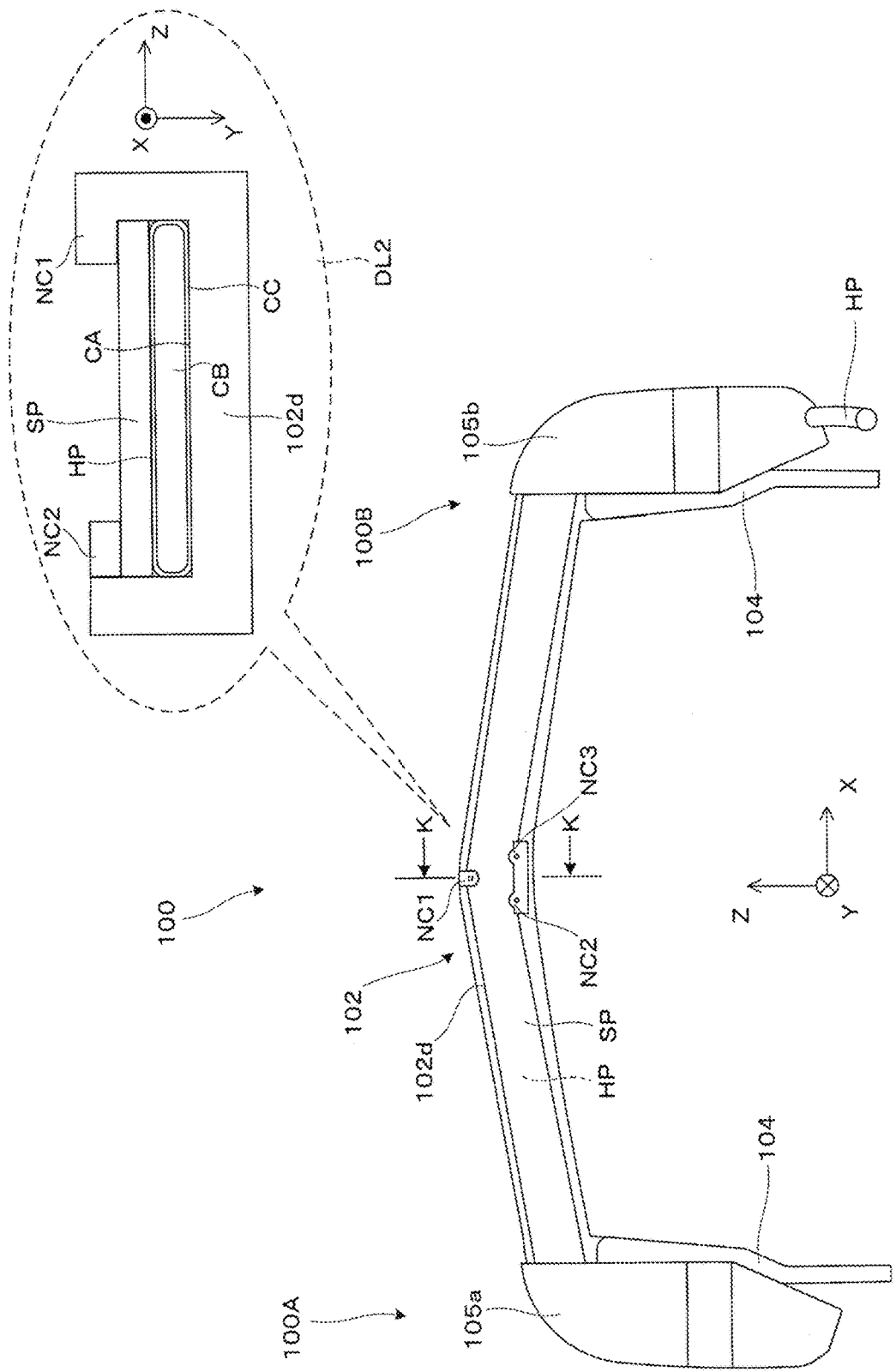
FIG. 5 is a conceptual view for explaining attachment of the harness to the frame.
Figure 6:
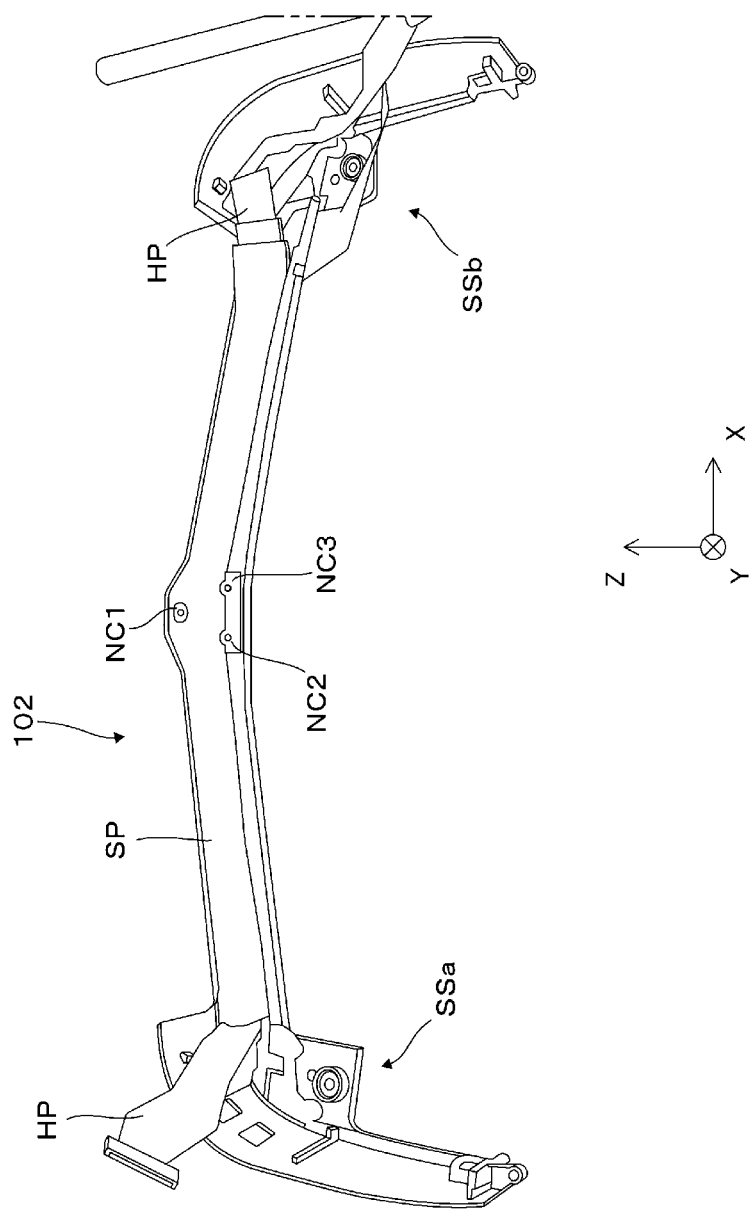
FIG. 6 is an image view showing the harness attached to the frame.
Figure 7:
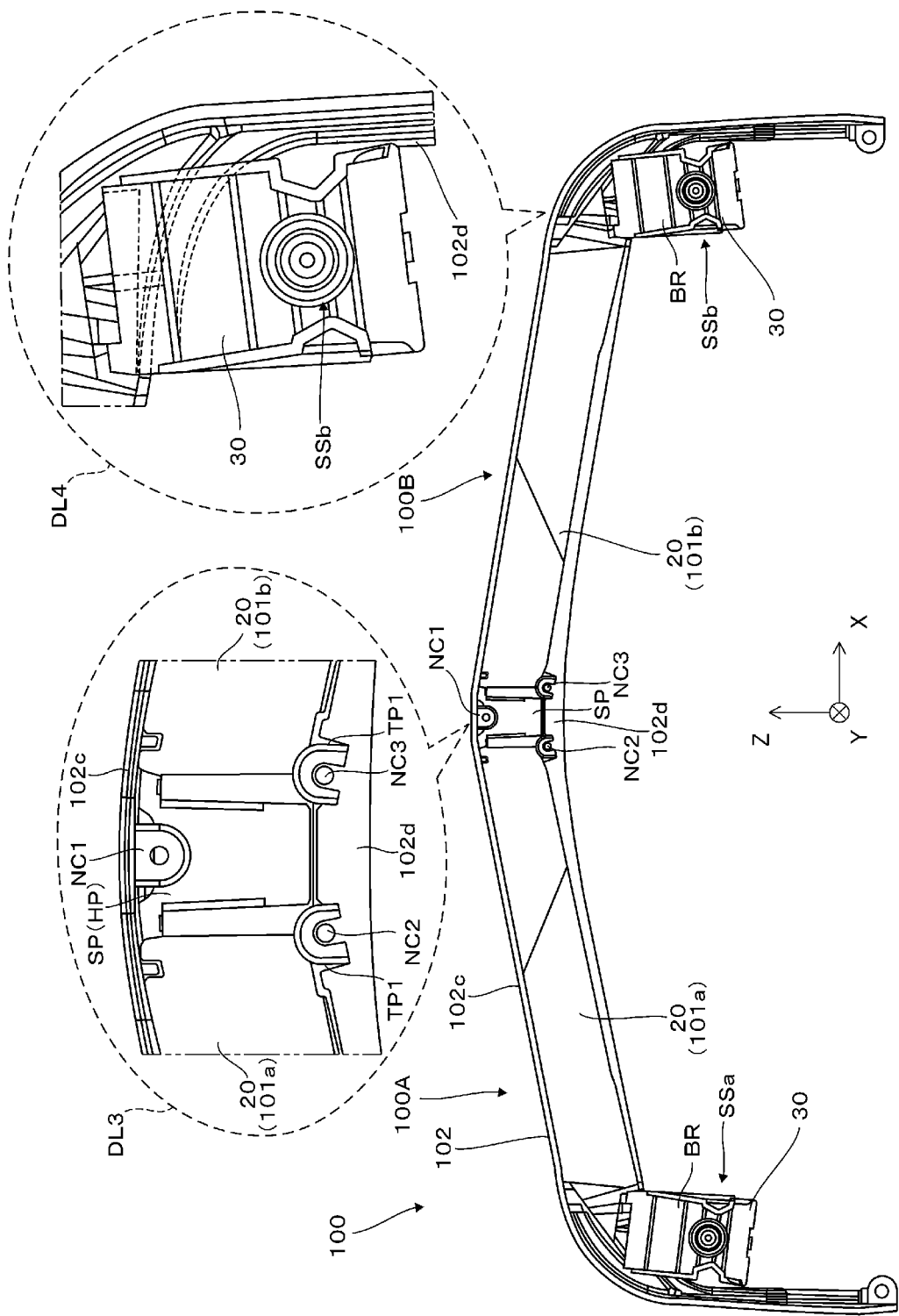
FIG. 7 is a conceptual plan view for explaining attachment of an optical component to the frame and an interposing structure.

FIG. 4 is a diagram for explaining the deck cover 102*d*, which is the metal component of the frame 102, and is comparable with reference to a comparative example in the illustrated example. FIG. 5 is a conceptual view for explaining attachment of the harness HP to the frame 102, and FIG. 6 is an image view showing the harness HP attached to the frame 102. FIG. 7 is a conceptual plan view for explaining attachment of the light-guiding device 20, serving as an optical component, to the frame and an interposing structure.

Of the above, first, description will be made of an internal structure of the frame 102 and a periphery thereof in the head-mounted display 100 with reference to the cross-sectional view of FIG. 2. In FIG. 2, a state $\alpha1$ is a perspective cross-sectional view illustrating a cutaway of the first display device 100A of the head-mounted display 100, and a state $\alpha2$ is a cross-sectional view with a direction indicated by an arrow A (−X direction) as a front direction in the state $\alpha1$.

In the cross sections in the drawing, when the head-mounted display 100 is viewed starting from an upper side (+Y side), first the cover member 102*c* is covering the deck cover 102*d* from an upper side and a front side (+Z side). Next, the deck cover 102*d* is in contact with the harness HP on a lower side (−Y side). Note that, as illustrated in FIG. 5, FIG. 6, and the like, the harness HP extends from the first display device 100A, which is the first display unit, to the second display device 100B, which is the second display unit. Here, the harness HP is connected to the first display device 100A of the first and second display devices 100A, 100B and, as a cable for power supply or signal transmission for the first display device 100A, extends on and along a downward side of the frame 102, is integrated with a cable for power supply or signal transmission for the second display device 100B on the second display device 100B side, and wired toward the device exterior (refer to FIG. 1).

Furthermore, returning to FIG. 2, the light-guiding device 20 is disposed downward of the harness HP. In other words, the harness HP is interposed between the frame 102 and the light-guiding device 20 serving as an optical component.

Note that a sheet member SP is interposed between the harness HP and the light-guiding device 20. The sheet member SP is, for example, a black resin member, and prevents or suppresses the harness HP from being visible to the observer (wearer) or unintentional light from being reflected by the harness HP and affecting the visibility of the observer. That is, the harness HP is interposed between the frame 102 and the light-guiding device 20 along with the sheet member SP.

An example of the structure of the harness HP will be described below with reference to FIG. 3. The harness HP is constituted by a cable CB for various signal transmissions and a conductive cloth CC as a sealing member (shield) for shielding the cable CB, as illustrated in the partially enlarged cross-sectional view surrounded by a dashed line DL1. In the harness HP, the conductive cloth CC is coupled, via a connector coupled to an external device (not illustrated), to a ground of a substrate provided to the external device.

Below, a specific example of the deck cover 102*d* serving as the metal component of the frame 102 will be described with reference to FIG. 4. In the drawing, a state β1 and a state β2 on an upper side are a bottom view and a plan view illustrating a deck cover 102*x* constituting a frame of a comparative example. On the other hand, a state γ1 and a state γ2 on a lower side are a bottom view and a plan view illustrating the deck cover 102*d* constituting the head-mounted display 100 of the present exemplary embodiment.

In the drawings, the deck cover 102x of the comparative example is coated substantially across the entire surface. That is, a non-conducting region NA formed by a coating and indicated by hatching extends across the entirety. In contrast, the deck cover 102d constituting the head-mounted display 100 of the present exemplary embodiment differs from the comparative example in including the non-conducting region NA covered by coating and a conducting region CA exposed and not covered by coating. More specifically, the deck cover 102d, as illustrated in the state γ2, is, for example, entirely coated on an externally visible outer portion with the entire surface covered by the non-conducting region NA, similar to the deck cover 102x of the comparative example illustrated in the state β2. In contrast, as illustrated in the state γ1, a contact location with the harness HP that is not externally visible upon becoming a product is the conducting region CA exposed and not covered by coating. For example, by providing a mask at the time of coating film formation at a location to be the conducting region CA, it is possible to form the deck cover 102d having the conducting region CA in a desired range, unlike the deck cover 102x of the comparative example.

Furthermore, in the present exemplary embodiment, as illustrated, the deck cover 102d is a rod-shaped member extending in the left-right direction, that is, the +X direction and the −X direction, to support a display unit or an optical component for causing the left eye and the right eye to visual recognize an image, and has an assembly structure for assembling these to both end portions and a center portion. Specifically, the deck cover 102d includes the pair of screwing structures SSa, SSb at the left and right end portions, and includes screwing structures NC1 to NC3 screwed at three points in the center portion, that is, a portion of a boundary between the right eye side and the left eye side.

For example, as illustrated in FIG. 7, the pair of right and left projection lenses 30 are respectively fixed with screws by the tightening of the pair of screwing structures SSa, SSb. Further, the light-guiding devices 20 serving as optical components are assembled to the frame 102 by the tightening of the screwing structures NC1 to NC3. During the fixing of these components, the harness HP provided along the deck cover 102d is held in an interposed state. That is, the pair of screwing structures SSa, SSb and the screwing structures NC1 to NC3 function as interposing structures interposing the harness HP. In particular, in this case, the harness HP extending in the +X direction and the −X direction is interposed between both end portions of the frame 102 by the pair of screwing structures SSa, SSb, and is interposed between the screwing structures NC1 to NC3 at the center portion of the frame 102. As a result, it is possible to bring the harness HP wired along the deck cover 102d, which is a rod-like member extending in the +X direction and the −X direction, into contact with the entire deck cover 102d.

With a configuration such as described above, in the head-mounted display 100 of the present exemplary embodiment, it is possible to maintain a state in which the conducting region CA formed extending along the harness HP in the deck cover 102d is electrically coupled to the conductive cloth CC (refer to FIG. 3 and the like), serving as a shield, across the entirety. Note that, in other words, the conducting region CA is formed along the harness HP, that is, the cable CB, and the deck cover 102d serving as the metal component of the frame 102 is electrically coupled to the conductive cloth CC surrounding the cable CB.

In the above case, because the conductive cloth CC is coupled to the ground of an external device, the deck cover 102d electrically coupled to the conductive cloth CC is also coupled to the ground. Accordingly, even when energization for signal communication or power supply occurs in the cable CB, for example, it is possible to avoid or suppress the generation of noise from the frame 102 and the effects on other electronic components. Accordingly, for example, with appropriate adjustment of the range of the conducting region CA and the like, the head-mounted display 100 can reliably satisfy electromagnetic interference (EMI) standards.

Further, in this case, the screwing structures SSa, SSb, and NC1 to NC3 serving as interposing structures entirely tighten the light-guiding devices 20 to the frame 102 side by a fastening force from the fixing with screws, and hold the conducting region CA of the frame 102 and the conductive cloth CC serving as the sealing member (shield) in a state of being electrically coupled.

Below, the details of the attachment of each component and the like will be described with reference to FIG. 5 and the like. First, as illustrated in FIG. 5 and FIG. 6, the harness HP extends from the first display device 100A to the second display device 100B, and is attached to the frame 102 together with the sheet member SP provided along and covering the harness HP. In particular, in the present exemplary embodiment, as in the cross-sectional view in the direction of an arrow KK and surrounded by a dashed line DL2 in FIG. 5, the screwing structure NC1 and the like are hook-shaped, and function as claw portions that hook and fix the harness HP, that is, the cable CB, along with the sheet member SP. As a result, the conducting region CA of the frame 102 and the conductive cloth CC serving as the sealing member can be held in a state of being electrically coupled.

Next, as illustrated in FIG. 7 and described above, the screwing structures SSa, SSb, and NC1 to NC3 function as a interposing structures that interpose the cable CB between the frame 102 and the first and second display devices 100A, 100B, that is, that interpose the cable CB from the +Y direction and the −Y direction. More specifically, first, as indicated by a surrounding dashed line DL3 toward the center, the screwing structures NC1 to NC3, as claw portions, hook and fix the harness HP including the cable CB along with the sheet member SP. Further, as illustrated, U-shaped grooves provided in tip end portions TP1 of the respectively corresponding light-guiding devices 20 are aligned with the screwing structures NC2, NC3. At the locations where the screwing structures NC1 to NC3 are provided, a nose piece, a shade attaching portion, and the like (not illustrated) may be collectively provided. For example, plate members for interposing and attaching the parts constituting each of these components are provided in accordance with the arrangement of the screwing structures NC1 to NC3, that is, screw holes, and are fixed with screws. As a result of the tip end portions TP1 of the light-guiding devices 20 being tightened and fixed in conjunction with this, the harness HP is pressed against a surface on a lower side (−Y side) of the deck cover 102d where the conducting region CA is provided.

On the other hand, on both end sides, for example, as illustrated in the area surrounded by a dashed line DL4, in relation to the second display device 100B for the left eye, the screwing structure SSb fastens, by fixing with a screw, the projection lens 30 serving as the optical component constituting the second display device 100B.

Here, the projection lens 30 has a structure in which a single lens or a plurality of lenses are housed in a lens barrel BR. In the illustrated example, the lens barrel BR is precisely positioned and fixed to the light-guiding device 20 with screws or the like, and the projection lens 30 and the light-guiding device 20 are integrated to constitute the second display device 100B. Thus, as a result of the projection lens 30, that is, the lens barrel BR, being tightened and fixed by the screwing structure SSb, the harness HP is pressed against the surface on the lower side (−Y side) of the deck cover 102d where the conducting region CA is provided.

Note that while neither illustrated nor described, with regard to the first display device 100A for the right eye as well, the screwing structure SSb is configured to perform the same function as that of the screwing structure SSb for the projection lens 30 serving as an optical component constituting the first display device 100A.

As described above, the conducting region CA of the frame 102 is entirely pressed against the conductive cloth CC, making it possible to ensure that the conducting region CA and the conductive cloth CC are held in a state of being electrically coupled.

Figure 8:
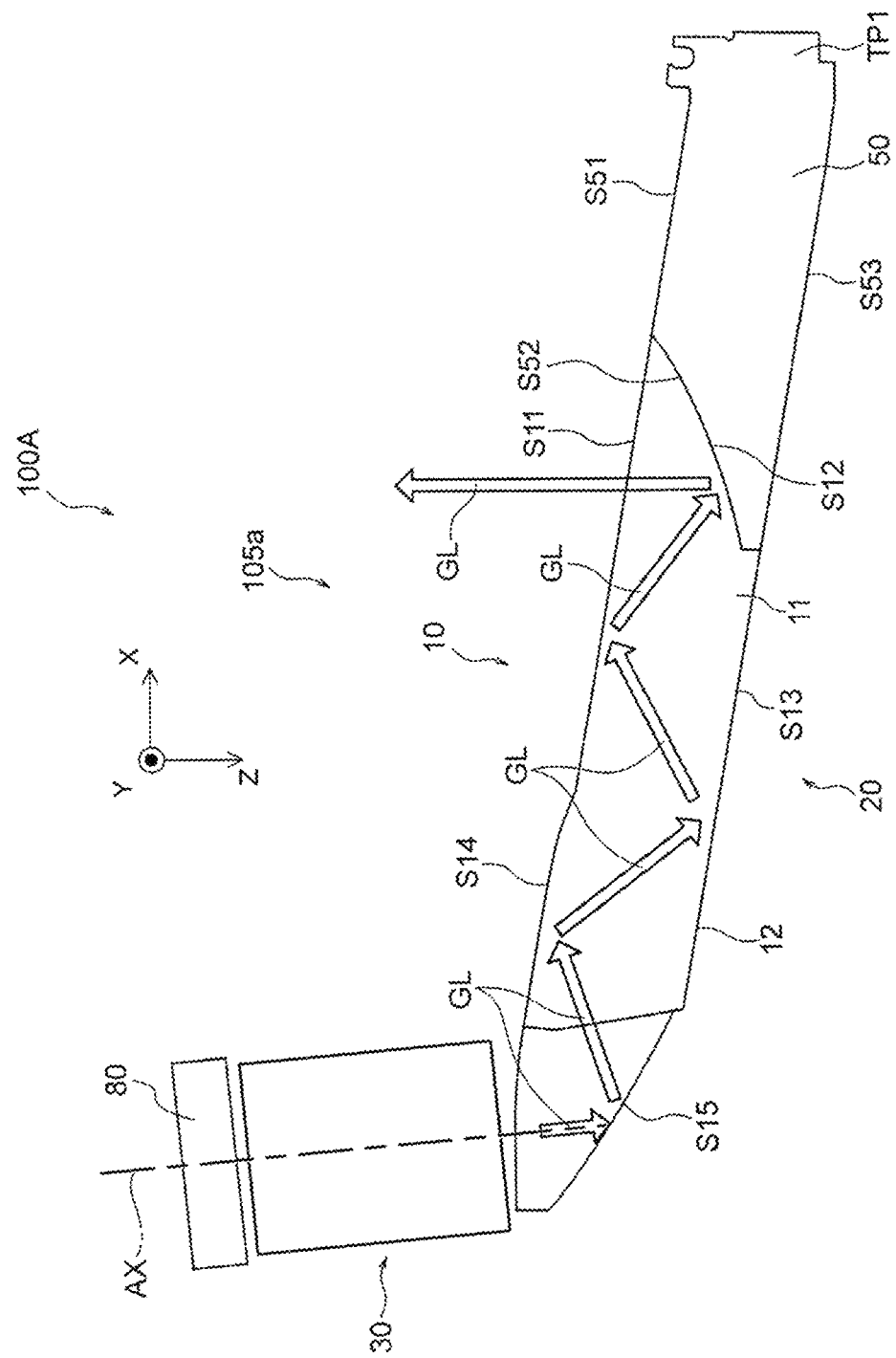
FIG. 8 is a conceptual plan view illustrating a light path of image light.

Below, with reference to FIG. 8 and the like, a conceptual description will be made of an example of a structure and the like for guiding image light by the head-mounted display 100. Note that, while the devices for guiding image light are the first display device 100A and the second display device 100B, the first display device 100A and the second display device 100B have equivalent structures with left-right symmetry and therefore only the first display device 100A will be described and the description of the second display device 100B will be omitted. As illustrated in FIG. 8, the first display device 100A includes the image display device 80 configured to form image light, the projection lens 30 for imaging, and the light-guiding device 20 (first optical member 101a) configured to guide image light that passed through the image display device 80 and the projection lens 30. The light-guiding device 20, as previously described, includes the light-guiding member 10 for guiding light and for the see-through perspective, and the light-transmitting member 50 for the see-through perspective.

The image display device 80 can be configured with an image element (image display element) constituted by a self-luminous type element such as an organic electroluminescent (EL) element, for example. Further, in addition to the image display element, which is a transmission-type spatial light modulating device, for example, the image display device 80 may have a configuration including an illumination device (not illustrated) that is a backlight configured to emit illumination light to the image display element, and a driving control unit (not illustrated) configured to control operations. The image display device 80 receives signal communication or power supply from the harness HP.

The projection lens 30 is a projection optical system including, as constituent elements, a single or a plurality of optical elements (lenses) arranged along an incident side optical axis AX, for example, and these optical elements are housed and supported by the lens barrel BR illustrated in FIG. 7. Note that the optical elements can form an intermediate image corresponding to the display image in an interior of the light-guiding member 10 in cooperation with a portion of the light-guiding member 10 constituting the light-guiding device 20 by configuring an aspherical lens including both an axially non-symmetric aspherical surface (non-axisymmetric aspherical surface) and an axially symmetric aspherical surface (axisymmetric aspherical surface). The projection lens 30 projects the image light formed by the image display device 80 toward the light-guiding device 20 and causes the image light to be incident on the light-guiding device 20. Note that, as an optical element (lens) constituting the projection lens 30, an axisymmetric spherical surface may also be used as the lens surface.

The light-guiding device 20, as previously described, includes the light-guiding member 10 for guiding light and for the see-through perspective, and the light-transmitting member 50 for the see-through perspective. The light-guiding member 10 is a portion of the light-guiding device 20, which is a prism type, and is a one-piece member. However, as illustrated in FIG. 2, the light-guiding member 10 can be divided into a first light-guiding portion 11 on a light-exiting side and a second light-guiding portion 12 on a light-incident side. The light-transmitting member 50 is a member (auxiliary optical block) that assists the see-through perspective function of the light-guiding member 10, and is integrally fixed with the light-guiding member 10 to form one light-guiding device 20. As previously described, the light-guiding device 20 is, for example, screwed into the lens barrel BR of the projection lens 30 and thus positioned and fixed relative to the projection lens 30 with high accuracy.

The light-guiding member 10 includes first to fifth sides S11 to S15 as side surfaces having an optical function. Of these surfaces, the first surface S11 and the fourth surface S14 are continuously adjacent, and the third surface S13 and the fifth surface S15 are continuously adjacent. Further, the second surface S12 is disposed between the first surface S11 and the third surface S13. A half mirror layer is attached to the surface of the second surface S12. The half mirror layer is a reflective film having optical transparency, (that is, a semi-transparent reflective film) which is formed by depositing a metallic reflective film or a dielectric multilayer film, and is provided with appropriate reflectance with respect to the image light.

Below, the light path of the image light (here, image light GL) will be briefly described. The light-guiding member 10 causes the image light GL from the projection lens 30 to be incident, and guides the image light GL toward the eye of the observer by reflecting the image light GL using the first to fifth surfaces S11 to S15 and the like. Specifically, the image light GL from the projection lens 30 is first incident on the fourth surface S14 and reflected by the fifth surface S15, is incident again from the inner side on the fourth surface S14 and is totally reflected, is incident on and totally reflected by the third surface S13, and is incident on and totally reflected by the first surface S11. The image light GL totally reflected by the first surface S11 is incident on the second surface S12, is partially reflected while partially passing through the half mirror layer provided on the second surface S12, and is once more incident on and passes through the first surface S11. The image light GL that has passed through the first surface S11 is incident, as a substantially parallel luminous flux, on the eye of the observer or an equivalent position. In other words, the observer observes the image formed by the image light GL as the virtual image.

The light-transmitting member 50 is integrally fixed with the light-guiding member 10, thus configuring the single light-guiding device 20 as previously described, and is a member (auxiliary optical block) that assists the see-through function of the light-guiding member 10. The light-transmitting member 50 includes a first transmission surface S51, a second transmission surface S52, and a third transmission surface S53 as side surfaces having an optical function. The second transmission surface S52 is disposed between the first transmission surface S51 and the third transmission surface S53. The first transmission surface S51 is on an extended surface of the first surface S11 of the light-guiding member 10, the second transmission surface S52 is a curved surface joined to and integrated with the second surface S12, and the third transmission surface S53 is on an extended surface of the third surface S13 of the light-guiding member 10.

As described above, the light-guiding device 20 allows the observer to visually recognize the image light using the light-guiding member 10, and also, due to the light-guiding member 10 and the light-transmitting member 50 operating in conjunction, causes the observer to observe the external world image with little distortion. That is, of the external light of the component light constituting the external world image to be visually recognized, the light incident on the −X side of the second surface S12 of the light-guiding member 10 passes through the third surface S13 and the first surface S11 of the first light-guiding portion 11. However, at this time, the third surface S13 and the first surface S11 are flat surfaces substantially parallel with each other (diopter of substantially 0), and thus aberrations and the like do not substantially occur. Further, when, of the external light, the light incident on the +X side of the second surface S12 of the light-guiding member 10, that is, the light incident on the light-transmitting member 50, passes through the third transmission surface S53 and the first transmission surface S51 provided thereto, the third transmission surface S53 and the first transmission surface S51 are flat surfaces substantially parallel with each other, and thus aberrations and the like do not occur. Furthermore, when, of the external light, the light incident on the light-transmitting member 50 corresponding to the second surface S12 of the light-guiding member 10 passes through the third transmission surface S53 and the first transmission surface S51, the third transmission surface S53 and the first transmission surface S51 are flat surfaces substantially parallel with each other, and thus aberrations and the like do not substantially occur. As described above, the observer observes the external world image with no distortion through the light-transmitting member 50.

The configuration such as described above is the same for the second display device 100B as well. This makes it possible to respectively form images respectively corresponding to the left eye and the right eye.

As described above, the head-mounted display 100 according to the present exemplary embodiment includes the frame 102 having conductivity, the first and second display devices 100A, 100B serving as optical components supported by the frame 102, the cable CB shielded by the conductive cloth CC serving as a sealing member, and the screwing structures SSa, SSb, and NC1 to NC3 serving as interposing structures that interpose the cable CB between the frame 102 and the first and second display devices 100A, 100B. The screwing structures SSa, SSb, and NC1 to NC3 hold the conducting region CA of the frame 102 and the conductive cloth CC in a state of being electrically coupled. In this case, the screwing structures SSa, SSb, and NC1 to NC3 hold the conducting region CA of the frame 102 having conductivity in a state of being electrically coupled to the conductive cloth CC that shields the cable CB. As a result, the frame 102 having conductivity is maintained in a state of being coupled to the ground via the conductive cloth CC, and noise generation caused by the frame 102 can be avoided or suppressed.

Further, the head-mounted display 100 according to the present exemplary embodiment includes the first and second display devices 100A, 100B serving as display units, the frame 102 having conductivity and supporting the first and second display devices 100A, 100B, and the cable CB disposed between the first and second display devices 100A, 100B and the frame 102. The cable CB is shielded by the conductive cloth CC serving as a shield, and the frame 102 includes the non-conducting region NA covered with a coating and the conducting region CA that is exposed, and is electrically coupled to the conductive cloth CC in the conducting region CA. In this case, the frame 102 having conductivity is electrically coupled to the conductive cloth CC in, of the non-conducting region NA and the conducting region CA, the conducting region CA, and thus is maintained in a state of being coupled to the ground via the conductive cloth CC, making it possible to avoid or suppress noise generation caused by the frame 102.

Second Exemplary Embodiment

Below, a head-mounted display according to a second exemplary embodiment will be described in detail with reference to FIG. 9 and the like. Note that the head-mounted display according to the present exemplary embodiment differs from that in the first exemplary embodiment in that a flexible printed circuit (FPC) substrate, that is, a flexible substrate, is used as a component having the function of a harness, that is, a cable, for power supply or signal transmission. In other respects, however, the head-mounted display is the same as that in the first exemplary embodiment and, therefore, reference is made to the contents of the first exemplary embodiment as appropriate with respect to the overall configuration of the head-mounted display, and the drawings and descriptions thereof are omitted.

Figure 9:
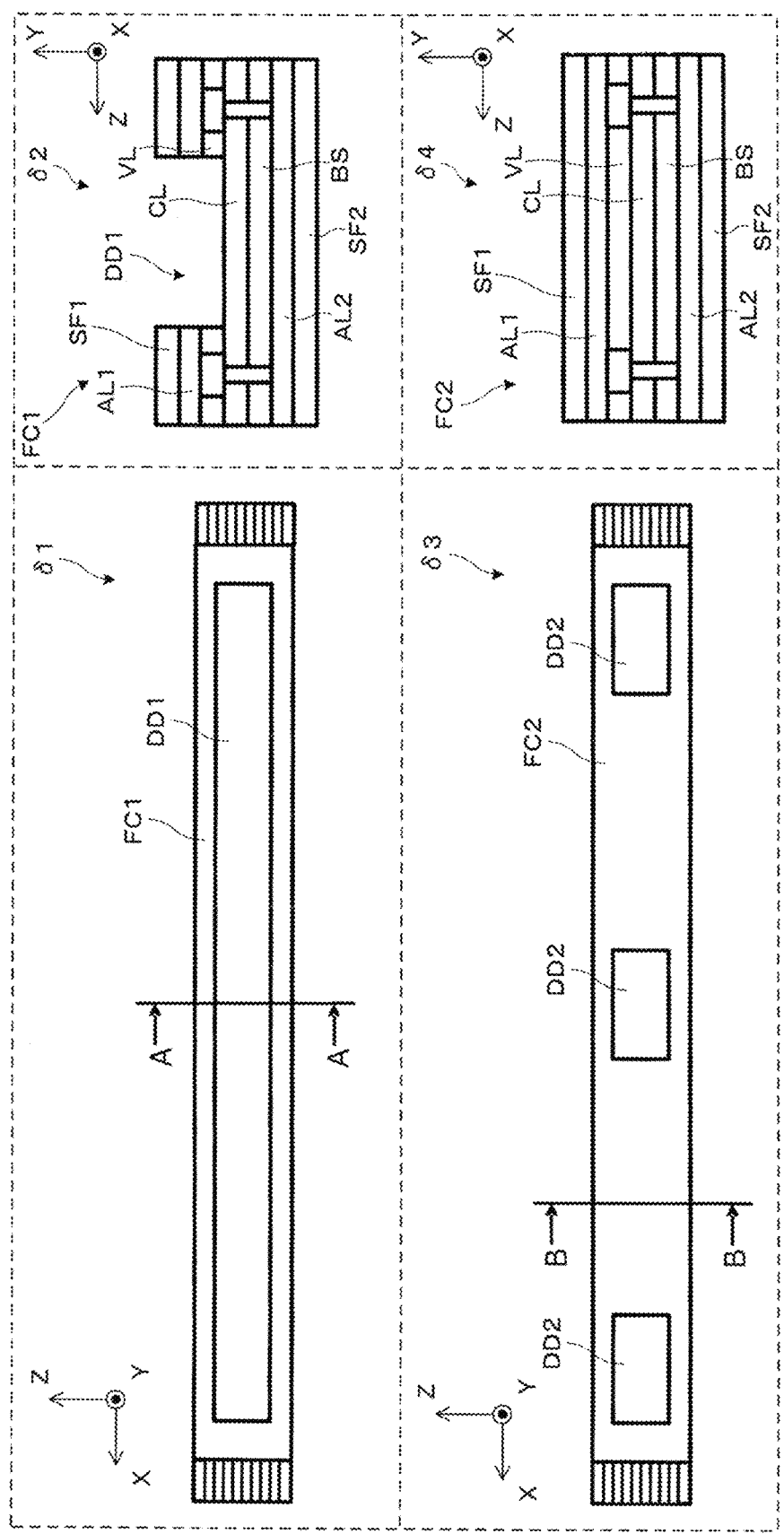
FIG. 9 is a conceptual view illustrating an example of a flexible substrate constituting a head-mounted display according to a second exemplary embodiment.
Figure 10:
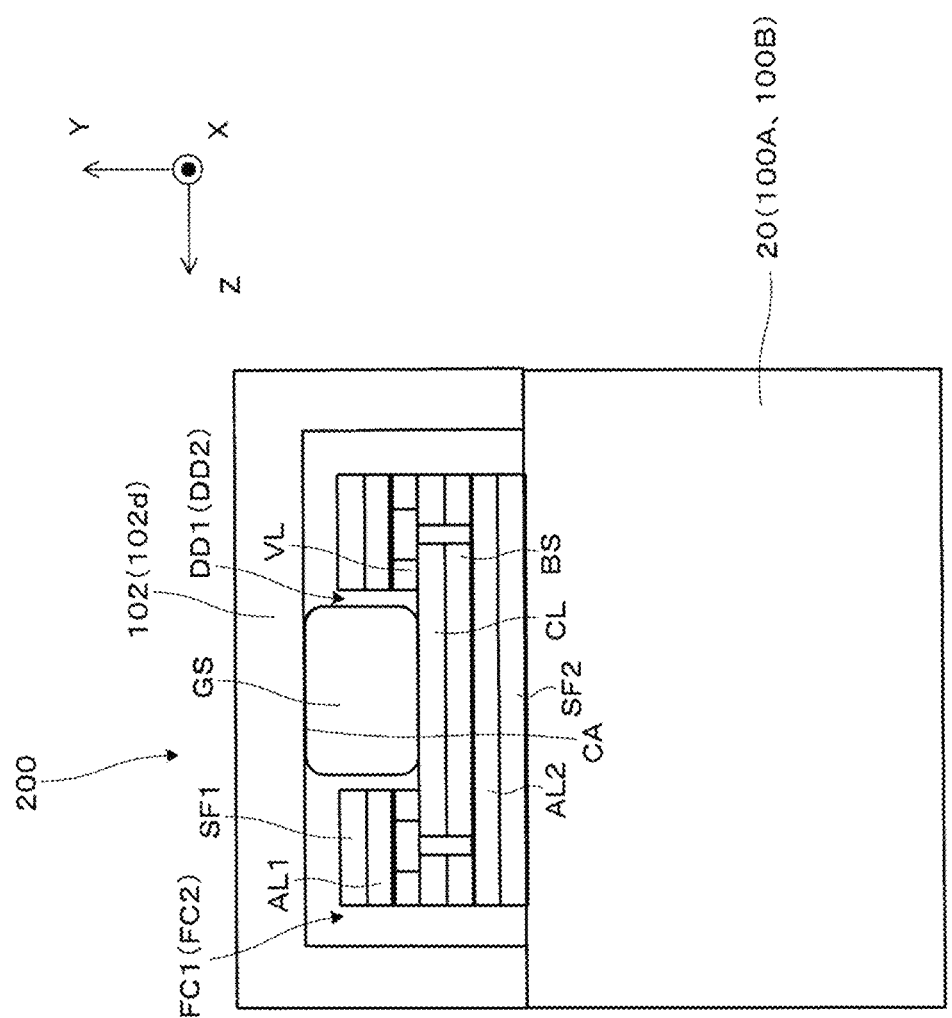
FIG. 10 is a conceptual cross-sectional view illustrating a structure of the head-mounted display according to the second exemplary embodiment.

FIG. 9 is a conceptual view illustrating an example of a flexible substrate constituting a head-mounted display according to the present exemplary embodiment, and FIG. 10 is a conceptual cross-sectional view illustrating a structure of a head-mounted display 200 according to the present exemplary embodiment.

First, in FIG. 9, a state δ1 is a plan view conceptually illustrating an example of a flexible substrate, and a state δ2 is a cross-sectional view taken along the line AA in the state δ1. A state δ3 is a plan view conceptually illustrating another example of a flexible substrate, and a state δ4 is a cross-sectional view taken along the line BB in the state δ3.

Here, as a configuration example of the flexible substrate, as illustrated in the state δ4, the flexible substrate is provided with a copper foil portion CL having conductivity and forming a circuit on a base material BS, and a coverlay VL is provided thereon. Further, a conductive adhesive is applied to both of these surfaces to form adhesive layers AL1, AL2, and to form shielding films SF1, SF2 as surfacing layers. In the illustrated example, an outermost layer on the side on which the circuit is formed is the shielding film SF1. Note that the above is merely an example, and a flexible substrate having another configuration may also be employed.

In general, a shielding portion of the outermost layer of the flexible substrate is often configured without conductivity. Therefore, as described above, when the flexible substrate is made to function as a cable of a head-mounted display, a structure for coupling the frame of the head-mounted display to the ground needs to be considered separately. Therefore, in the present exemplary embodiment, the copper foil portion CL is partially exposed as in a flexible substrate FC1 serving as one example illustrated in the state δ1 and a flexible substrate FC2 serving as another example illustrated in the state δ3. That is, as is clear upon comparing the state δ2 indicating the exposed location and the state δ4 indicating the unexposed location, the flexible substrates FC1, FC2 are shaved, in part, from the shielding film SF1 of the outermost layer to the coverlay VL.

Note that, as illustrated, in the flexible substrate FC1, an exposed region DD1 exposing the copper foil portion CL is formed continuously in a direction in which the flexible substrate FC1 extends, that is, a direction in which the frame 102 extends. In contrast, in the flexible substrate FC2, an exposed region DD2 exposing the copper foil portion CL is formed intermittently in a direction in which the flexible substrate FC2 extends, that is, a direction in which the frame 102 extends. In this regard, the two differ.

In the present exemplary embodiment, such exposed regions DD1, DD2 as described above are provided and further, as illustrated in the cross-sectional view of FIG. 10, a gasket GS having conductivity and coupled to the copper foil portion CL is provided to the exposed regions DD1, DD2. Note that, in the description below, description will be made of the head-mounted display 200 illustrated in FIG. 10 in which the flexible substrate FC1 is mounted.

As conceptually illustrated in FIG. 10, the head-mounted display 200 according to the present exemplary embodiment includes the frame 102 having conductivity and supporting the light-guiding devices 20 constituting the display unit, and the flexible substrate FC1 disposed between the light-guiding devices 20 and the frame 102. The flexible substrate FC1 is configured to include the gasket GS electrically coupled to the conducting region CA of the frame 102.

As described above, the gasket GS of the flexible substrate FC1 is coupled to the conducting region CA exposed and not covered by a coating at the deck cover 102d of the frame 102. That is, the deck cover 102d is electrically coupled to the copper foil portion CL of the flexible substrate FC1 via the gasket GS. Here, the copper foil portion CL of the flexible substrate FC1 is coupled, via a connector coupled to an external device (not illustrated), to a ground of a substrate provided on the external device, for example. As a result, the frame 102 is coupled to the ground.

As described above, the head-mounted display 200 according to the present exemplary embodiment includes the frame 102 having conductivity and the flexible substrate FC1 disposed between the light-guiding devices 20 and the frame 102, and the flexible substrate FC1 includes the gasket GS electrically coupled to the conducting region CA of the frame 102. Thus, the frame 102 having conductivity is maintained in a state of being coupled to the ground via the gasket GS, and noise generation caused by the frame 102 can be avoided or suppressed.

Furthermore, in the present exemplary embodiment, an example is given of a case in which the outermost layer of the flexible substrate is configured to not be conductive when the flexible substrate is used as a harness, that is, a component having the function of a cable for power supply or signal transmission. In contrast, with the outermost layer of the flexible substrate configured to be conductive, it is also conceivable to employ the flexible substrate in a configuration similar to that of the first exemplary embodiment. For example, in the configuration described above, it is conceivable to make the shielding films SF1, SF2 conductive, that is, to use shielding films having conductivity. Specifically, it is conceivable to employ a method of printing a silver paste as a shielding layer or the like. In this case, the shielding films having conductivity act as sealing members (shields) in the same way as the conductive cloth CC of the first exemplary embodiment, and thus noise generation caused by the frame 102 can be avoided or suppressed while promoting anti-noise measures in the flexible substrate.

Other

The present disclosure is described above based on exemplary embodiments. However, the present disclosure is not limited to the above-described exemplary embodiments, and can be embodied in various aspects without departing from the spirit and scope of the present disclosure.

Figure 11:
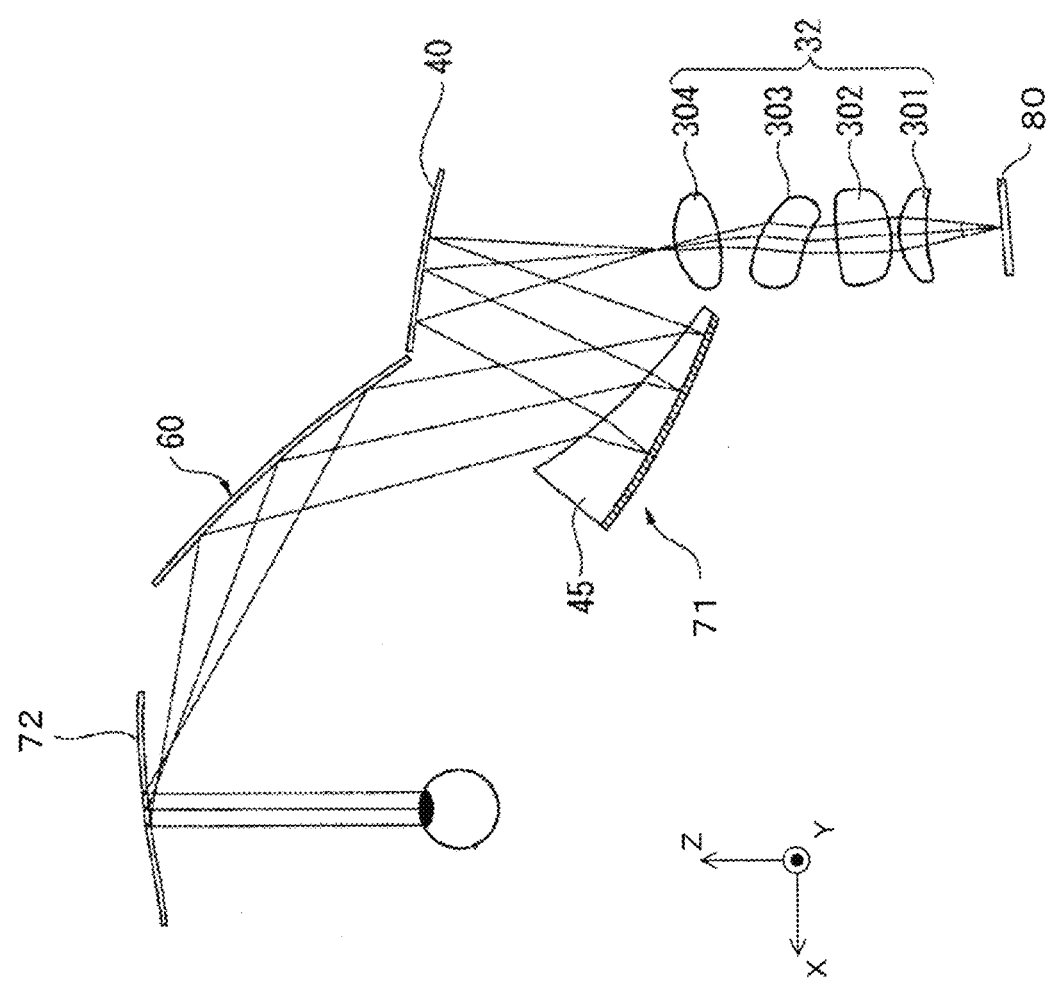
FIG. 11 is a conceptual plan view for explaining a modified example of an optical system constituting the head-mounted display.

While, in the above, the first and second display devices 100A, 100B serving as the display units are configured to totally reflect and guide the image light GL in the interior in the light-guiding devices 20 and form an image to be visually recognized, various optical systems can be conceivably employed as the display units. For example, as in one modified example illustrated in a conceptual plan view of FIG. 11, it is also conceivable to apply a configuration using a diffraction element such as a hologram element. Note that, in the case of FIG. 11, a projection lens 32 constituted by a plurality of lenses 301 to 304, a mirror 40, a correction optical system 45, a first diffraction element 71 of a reflection type, a light-guiding system 60, and a second diffraction element 72 of a reflection type are configured to guide the image light from the image display device (image element) 80.

Further, while in the above description the conducting region CA formed extending along the harness HP is in a state of being electrically coupled to the conductive cloth CC serving as a shield across the entirety, various forms may be used as necessary as long as the state of being electrically coupled is maintained. For example, the harness HP may be intermittently coupled along the conducting region CA of the frame 102. Further, a portion of the contact location between the harness HP and the conducting region CA may be adhered by adhesive tape such as double-sided tape. Further, here, it is also conceivable to employ such a tape having conductivity. Further, with regard to shape as well, the conducting region CA may be formed intermittently along the harness HP.

Further, in the description above, as the image display device (image element) 80, various devices can be used. For example, a configuration can be adopted that uses a reflective liquid crystal display, and in place of the image display device formed from a liquid crystal display device and the like, a digital micro-mirror device and the like can be used.

While, in the description described above, the half mirror layer of the second surface S12 is, for example, a metal reflective film or a dielectric multilayer film, the film can be replaced with a planar or curved hologram element. Further, the fifth surface S15, in addition to a mirror reflective surface, can also be constituted by a hologram element.

While, in the description above, the light-guiding member 10 and the like extend in the lateral direction in which the eyes are aligned, the light-guiding member 10 may be disposed extending in the vertical direction. In this case, the light-guiding member 10 has a parallel structure disposed in parallel rather than in series.

While, in the description above, only a mode in which the image light and the external light are superimposed is described, the present disclosure may be applied to, for example, a virtual image display device capable of switching between a mode set to image light only and a mode set to external light only, without superimposing the two. As an example, the present application can be applied to display devices that perform so-called virtual reality (VR) image formation.

Further, the technology of the claimed disclosure may also be compatible with a so-called see-through video product constituted by a display and an imaging device.

As described above, a head-mounted display according to an aspect of the present disclosure includes a frame having conductivity, an optical component supported by the frame, a cable shielded by a sealing member, and an interposing structure configured to interpose the cable between the frame and the optical component. The interposing structure is further configured to hold a conducting region of the frame and the sealing member in a state of being electrically coupled.

In the above-described head-mounted display, the conducting region of the frame having conductivity is held in a state of being electrically coupled to the sealing member of the cable by the interposing structure. Thus, the frame having conductivity is maintained in a state of being coupled to the ground via the sealing member, and noise generation caused by the frame can be avoided or suppressed.

According to a specific aspect of the present disclosure, the sealing member includes either a conductive cloth or a shielding film having conductivity. In this case, the conductive cloth and the shielding film having conductivity are energized, making it possible to couple the frame having conductivity to the ground.

According to another aspect of the present disclosure, the sealing member is electrically coupled to a metal component of the frame. In this case, noise generation caused by the metal component can be avoided or suppressed.

According to yet another aspect of the present disclosure, a conducting region is formed along the cable. In this case, noise generation in the frame associated with the energization of the cable can be avoided or suppressed.

According to yet another aspect of the present disclosure, the optical component includes a first display unit and a second display unit configured to display an image in correspondence with a left eye and a right eye, and the cable extends from the first display unit to the second display unit and is coupled to either the first display unit or the second display unit. In this case, visual recognition of the image by both eyes is possible and, under such circumstances, the cable can be collected in one location.

According to yet another aspect of the present disclosure, the frame includes a claw portion configured to hook and fix the cable at a position between the first display unit and the second display unit. In this case, the cable can be held by the claw portion.

According to yet another aspect of the present disclosure, the interposing structure is a screwing structure configured to screw and fix the optical component to the frame. In this case, the interposed state can be reliably maintained by fastening based on fixing with screws.

As described above, a head-mounted display according to another aspect of the present disclosure includes a display unit, a frame having conductivity and configured to support the display unit, and a cable disposed between the display unit and the frame. The cable is shielded by a shield, and the frame includes a non-conducting region covered with a coating and a conducting region that is exposed, and is electrically coupled to the shield in the conducting region.

According to the above-described head-mounted display, the frame having conductivity is electrically coupled to the shield in, among the non-conducting region and the conducting region, the conducting region, and thus is maintained in a state of being coupled to the ground via the shield, making it possible to avoid or suppress noise generation caused by the frame.

According to another aspect of the present disclosure, the display unit includes a first display unit and a second display unit configured to display an image in correspondence with a left eye and a right eye, and the cable extends from the first display unit to the second display unit and is coupled to either the first display unit or the second display unit. In this case, visual recognition of the image by both eyes is possible and, under such circumstances, the cable can be collected in one location.

According to another aspect of the present disclosure, the head-mounted display further includes an interposing structure configured to interpose the cable between the frame and the display unit. The interposing structure is further configured to hold the conducting region of the frame and the shield in a state of being electrically coupled. In this case, the conducting region of the frame having conductivity is held in a state of being electrically coupled to the shield of the cable by the interposing structure, and thus the frame having conductivity can be maintained in a state of being coupled to the ground.

As described above, a head-mounted display according to yet another aspect of the present disclosure includes a display unit, a frame having conductivity and configured to support the display unit, and a flexible substrate disposed between the display unit and the frame. The flexible substrate includes a gasket electrically coupled to a conducting region of the frame.

According to the above-described head-mounted display, the frame having conductivity is maintained in a state of being coupled to the ground via the gasket, and noise generation caused by the frame can be avoided or suppressed.

What is claimed is:

1. A head-mounted display comprising:
   an optical component that includes:
      a first optical member that guides a first image light, and
      a second optical member that guides a second image light;
   a frame that supports the optical component and that extends along a first direction in which the first optical member and the second optical member are aligned; and
   a cable that is shielded by a sealing member being grounded, wherein
   the frame includes:
      a conducting region that has conductivity and that extends along the first direction so as to overlap with the cable,
      a non-conducting region that is provided so as to surround the conducting region, and
      an interposing structure that interposes the cable between the frame and the optical component in a state where the conducting region of the frame and the sealing member are electrically coupled.

2. The head-mounted display according to claim 1, wherein the sealing member includes either a conductive cloth or a shielding film having conductivity.

3. The head-mounted display according to claim 1, wherein the sealing member is electrically coupled to a metal component of the frame.

4. The head-mounted display according to claim 1, wherein the optical component includes:
   a first image display unit that emits the first image light to the first optical member; and
   a second image display unit that emits the second image light to the second optical member, and
   the cable extends from the first image display unit to the second image display unit and is coupled to either the first image display unit or the second image display unit.

5. The head-mounted display according to claim 4, wherein the frame includes a claw portion that hooks and fixes the cable at a position between the first optical member and the second optical member in the first direction.

6. The head-mounted display according to claim 1, wherein the interposing structure is a screwing structure that screws and fixes the optical component to the frame.

7. A head-mounted display comprising:
- a display unit that includes:
    - a first optical member that guides a first image light, and
    - a second optical member that guides a second image light;
- a frame that supports the display unit and that extends along a first direction in which the first optical member and the second optical member are aligned; and
- a cable that is shielded by a shield being grounded, wherein
- the frame includes:
    - a non-conducting region that is covered with a coating, and
    - a conducting region that has conductivity, that is not covered with the coating, and that extends along the first direction so as to overlap with the cable, and
- the non-conducting region is provided so as to surround the conducting region.

8. The head-mounted display according to claim 7, wherein the display unit includes:
- a first image display unit that emits the first image light to the first optical member; and
- a second image display unit that emits the second image light to the second optical member, and
- the cable extends from the first image display unit to the second image display unit and is coupled to either the first image display unit or the second image display unit.

9. The head-mounted display according to claim 8, further comprising an interposing structure that interposes the cable between the frame and the display unit, wherein
- the interposing structure holds the conducting region of the frame and the shield in a state where the conducting region of the frame and the shield are electrically coupled.

10. A head-mounted display comprising:
- a display unit that includes:
    - a first optical member that guides a first image light, and
    - a second optical member that guides a second image light;
- a frame having conductivity, configured to support the display unit, and extending along a first direction in which the first optical member and the second optical member are aligned;
- a cable that is shielded by a shield being grounded; and
- a flexible substrate disposed between the display unit and the frame, wherein
- the frame includes:
    - a conducting region that has conductivity and that extends along the first direction so as to overlap with the cable, and
    - a non-conducting region that is provided so as to surround the conducting region, and
- the flexible substrate includes a gasket that is grounded and electrically coupled to the conducting region of the frame.

* * * * *